United States Patent [19]

Joanblanq et al.

[11] Patent Number: 5,774,388
[45] Date of Patent: Jun. 30, 1998

[54] DEVICE FOR ELECTRONICALLY CALCULATING A FOURIER TRANSFORM AND METHOD OF MINIMIZING THE SIZE OF INTERNAL DATA PATHS WITHIN SUCH A DEVICE

[75] Inventors: Christophe Joanblanq, La Terrasse; Emmanuel Bidet, Grenoble, both of France

[73] Assignee: France Telecom, France

[21] Appl. No.: 416,907

[22] PCT Filed: Aug. 10, 1994

[86] PCT No.: PCT/FR94/00996

§ 371 Date: Jun. 7, 1995

§ 102(e) Date: Jun. 7, 1995

[87] PCT Pub. No.: WO95/04963

PCT Pub. Date: Feb. 16, 1995

[30] Foreign Application Priority Data

Aug. 11, 1993 [FR] France .................................. 93 09865

[51] Int. Cl.[6] .................................................. G06F 15/00
[52] U.S. Cl. .......................................... 364/726; 382/280
[58] Field of Search ................................... 364/726, 725, 364/727; 382/280, 281

[56] References Cited

U.S. PATENT DOCUMENTS

| | | | |
|---|---|---|---|
| 3,746,848 | 7/1973 | Clary | 364/726 |
| 3,783,258 | 1/1974 | Chwastyk | 364/726 |
| 3,892,956 | 7/1975 | Fuss | 364/726 |
| 3,899,667 | 8/1975 | Simone | 364/726 |
| 4,534,009 | 8/1985 | McGee | 364/726 |
| 4,929,954 | 5/1990 | Elleaume | 364/726 |

OTHER PUBLICATIONS

IEEE Transactions on Acoustics, Speech and Signal Processing vol. 37, No. 12, Dec. 1989, New York.
Proceedings of the 7th Symposium on Computer Arithmetic, IEEE Computer Society New York US 4 Jun. 1985, Urbana Illinois pp. 223–230.
IEEE Journal of Solid–State Circuits vol. 20, No. 3, Jun. 1985, New York pp. 761–769.
IEEE Transactions on Acoustics, Speech and Signal Processing vol. 23, No. 2, Apr. 1975, New York pp. 189–201.
Proceedings of the 10th International Conference on Pattern Recognition IEEE Press New York US 16 Jun. 1990, Atlantic City NJ pp. 385–388.
Systems & Computers in Japan vol. 18, No. 12, Dec. 1987, New York pp. 18–27.

*Primary Examiner*—Reba I. Elmore
*Assistant Examiner*—Emmanuel L. Moise

[57] ABSTRACT

In order to minimize the size of internal data paths within a device with a series or pipelined architecture for calculating a Fourier transform of a predetermined initial size, a sequence of Fourier transform elementary processing operations of predetermined elementary sizes smaller than the initial size are performed on data blocks with successively reduced sizes from one elementary processing operation to the next. A global dynamic value is determined for each data block derived from a current elementary processing operation, based on dynamic values of all of the data of the block. The block data are then reframed, taking into account the global dynamic value, before full subsequent elementary processing on said data is carried out.

20 Claims, 5 Drawing Sheets

| S | S | S | BT1 | BT2 | BT3 | BT4 | BT5 | BT6 |

| S | BT1 | BT2 | BT3 | BT4 | BT5 | BT6 | 0 | 0 |

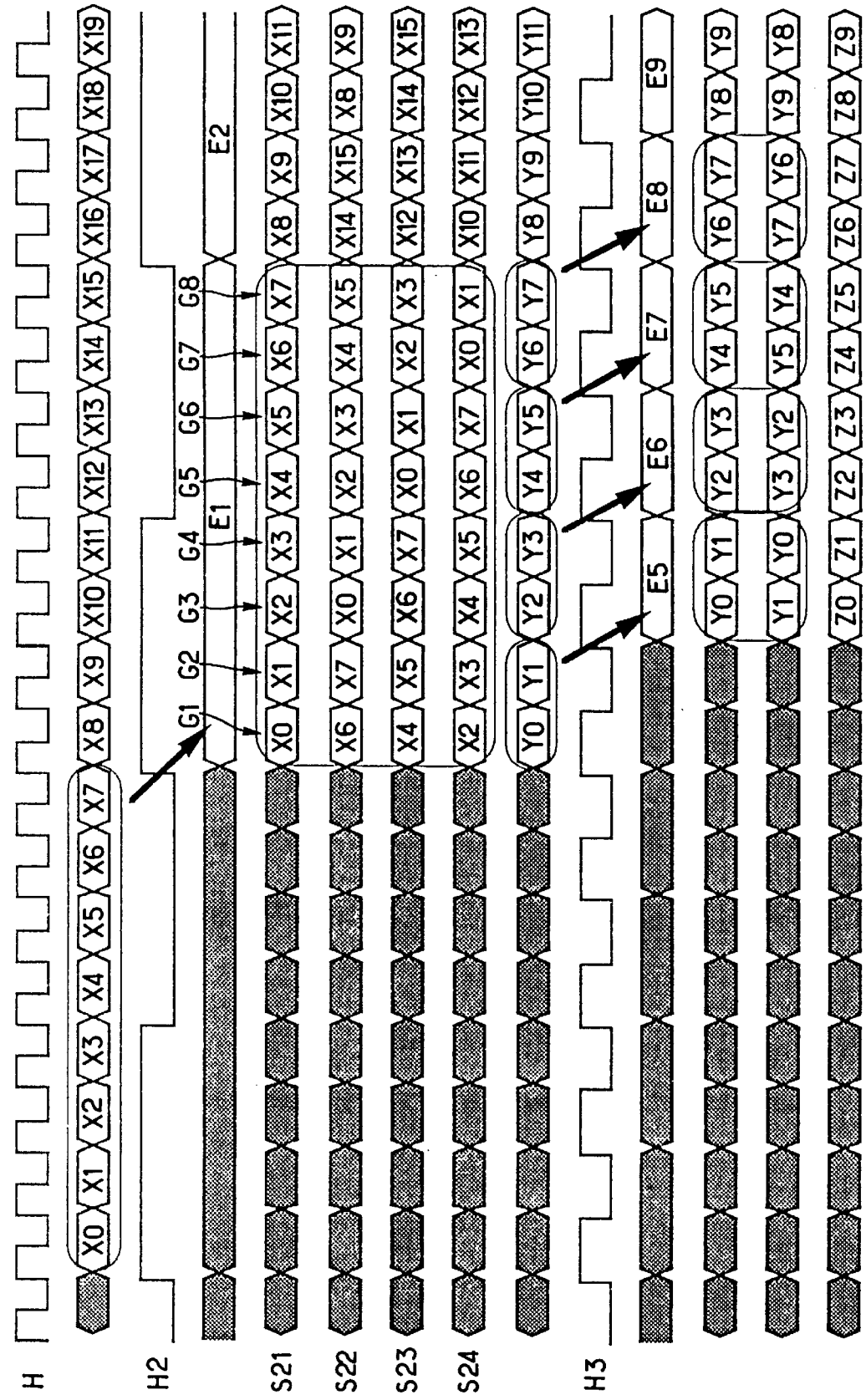

5,774,388

DEVICE FOR ELECTRONICALLY CALCULATING A FOURIER TRANSFORM AND METHOD OF MINIMIZING THE SIZE OF INTERNAL DATA PATHS WITHIN SUCH A DEVICE

BACKGROUND OF THE INVENTION

1. Field of the Invention

The invention concerns Fourier transform calculation devices having a so-called serial or "pipeline" architecture, and their mode of operation.

2. Description of the Related Art

The literature describes many implementations of Fourier transforms that are either dedicated or programmed on signal processing microprocessors. Most of these implementations use a variant of the Cooley-Tukey algorithm, which is well known to the person skilled in the art, and which reduces the number of arithmetic operations required to calculate the Fourier transform. Among other things, this algorithm simplifies the calculation of a fast Fourier transform of size $r^p$ where r represents the "root". as it is usually called by the person skilled in the art, by breaking the calculation down into the calculation of r Fourier transforms of size $r^{p-1}$ with further complex multiplications and additions. By applying this simplification iteratively the calculation of Fourier transforms of size r is made easy, especially if r is chosen as equal to 2 or 4, with intermediate additions and multiplications.

The Cooley-Tukey algorithm uses a calculation graph with a butterfly shape, well known to the person skilled in the art.

Various hardware architectures can be used to implement this butterfly calculation structure.

A first solution uses a respective hardware operator capable of carrying out a butterfly type calculation for each butterfly of the graph. This solution is feasible only for implementation of small Fourier transforms, however.

A second solution uses a single butterfly hardware operator which carries out in succession the calculations corresponding to all the butterflies of all the stages of the graph. A solution of this kind has the drawback of needing a very fast hardware operator and an input memory separate from the memory into which intermediate calculation results are written. This is to avoid access conflict when a data block enters the operator while the preceding block is still being processed. It is therefore necessary to provide two memories each having a capacity of N complex words where N denotes the size of the Fourier transform, with the result that the circuit as a whole has a large surface area, especially if N is large.

An intermediate solution is to use a butterfly type hardware operator for each stage of the graph and a memory element the function of which is to present the data to the input of the operator in the correct order, given the butterflies of the graph of the stage in question.

Architectures of this kind are called series or pipeline architectures by the person skilled in the art.

A pipeline architecture circuit for calculating a Fourier transform of predetermined initial size comprises a plurality of successive processing stages connected in series between the input and the output of the circuit by internal data paths. Each stage includes butterfly type processing means for processing Fourier transforms having a predetermined size smaller than the initial size using blocks of data of progressively decreasing size from one stage to the next. These transform sizes can be the same and equal to the root of the Fourier transform. The expression "uniform root Fourier transform" is then used. The transform sizes can be different from one stage to the next in the case of "mixed" root Fourier transforms.

One example of a pipeline architecture of this kind is described in the article by BI and JONES entitled "A Pipelined FFT Processor for Word-Sequential Data", IEEE Transactions on Acoustic Speech and Signal Processing, vol. 37, No. 12, December 1989, p. 1982–1985.

Independently of the type of architecture used, the problem arises of the dynamics of the intermediate and output data, given the dynamic of the input data. By "dynamic" is meant in the present context the number of bits, including the sign bit, used to represent the data. Butterfly type hardware operators carry out complex multiplications and additions. It is of course unrealistic to retain all the bits of the results obtained multiplication by multiplication. It is standard practice, in particular in pipeline architectures, to work with a constant dynamic, i.e. to represent input, intermediate and output data on the same number of bits.

However, if the dynamic is constant, the dynamic value of the intermediate data cannot be known in advance. By the "dynamic value" of the data is meant in this context the range of values in which the data is situated, for example between −0.5 and +0.5, or between −0.05 and +0.05, and so on.

A first solution is to extend the dynamic of the data globally a priori, i.e. to estimate a priori the dynamic needed for the output data of the circuit, so as not to lose too much accuracy on the significant bits, assuming that no saturation occurs in the internal calculations, and thereafter increasing the size of the input data words by the estimated number of additional bits.

Intermediate and output data are therefore also represented by words of this size. This increases the size of the internal data paths of the circuit, which can be large in the case of large Fourier transforms requiring several stages of processing, and this imposes a penalty in terms of an increase in the total surface area of the circuit when implemented on a silicon chip.

Another solution also extends the dynamic of the data paths a priori, but stage by stage. This solution is definitely more advantageous than the first, but it also leads to an artificial increase in the size of the internal data paths of the data circuit and therefore in its surface area.

The article by BI and JONES previously referred to does not mention any solution to this problem of the dynamic of the data.

SUMMARY OF THE INVENTION

The invention is directed to providing a more satisfactory solution to this problem.

One object of the invention is to propose a Fourier transform calculation device of the constant dynamic type in which the size of the internal data paths is not artificially increased.

The invention therefore consists in an electronic device for calculating a Fourier transform of a predetermined initial size, comprising a plurality of successive processing stages connected in series between the input and the output of the device by internal data paths and comprising respective processing means adapted to carry out Fourier transform processing of predetermined sizes smaller than the initial size on blocks of data of successively reduced size from one stage to the next. In accordance with one general feature of the invention the device comprises:

means for determining a global dynamic value for each data block supplied by the processing means of a previous processing stage from dynamic values of all the data of said block, means for delaying supply of the data of said block to the processing means of the current stage at least until all the data of said block has been supplied by the processing means of the previous processing stage, intermediate rejustification means for rejustifying the data of said block allowing for the corresponding global dynamic value and for supplying the rejustified data to the processing means of the current processing stage, and means for determining final dynamic values associated with the output data and obtained from the global dynamic values successively calculated, in such a way as to minimize the size of the internal data paths of the device.

In other words, the invention provides adaptive rejustification, i.e. rejustification that allows for a dynamic value calculated on data blocks of progressively smaller size from one stage to the next.

In one embodiment of the device of the invention the input data is received sequentially at an input frequency determined by a basic clock signal. The processing means of the tth stage are adapted to carry out Fourier transform processing of size $r_t$ on successive data blocks at the frequency of the basic clock signal. The time-delay means include first selective time-delay means adapted to memorize blocks of data obtained from those supplied by the processing means of the previous stage and to supply to the processing means of the current stage at the rate of the basic clock signal and with a predetermined time-delay, for each block received, successive groups of $r_t$ data words in a predetermined order. The time-delay means also include second time-delay means connected to the first and also timed by the basic clock signal. The first and second time-delay means jointly memorize all the data of each block from the processing means of the preceding stage. In other words, the combined memory capacity of the first and second time-delay means is at least equal to the number of data words.

The first selective time-delay means of the tth stage advantageously have $r_t$ outputs connected to the processing means of that stage and two sets of $r_t-1$ time-delay elements connected in series. The output of the final time-delay element of the first set is connected directly to one output of the $r_t$ outputs of the first time-delay means, and the outputs of the time-delay elements of the second set are respectively connected to the other outputs of the first time-delay means via one input of selective switching means having two inputs. The inputs of the time-delay elements of the first set are respectively connected to the other inputs of the two-input selective switching means. The second time-delay means include a time-delay element connected to the input of the first time-delay means. All the time-delay elements advantageously have the same memory size.

The time-delay elements preferably include dynamic delay lines.

In one embodiment of the device the means for determining the global dynamic value of each block include means for determining the number of duplicated sign bits of each data word of the block, said global dynamic value associated with the block being the smallest of the numbers of duplicated sign bits.

The intermediate rejustification means advantageously include means for shifting the bits of each data word of the block towards the most significant bit, said shift means being connected to the means for determining the global dynamic value.

The time-delay means are advantageously between the processing means of each pair of consecutive stages, while the means for determining global dynamic values are connected to the output of the processing means of each stage. In one embodiment the processing means of each stage include a set of adders/subtractors followed by a multiplier and in that the shift means are on the input side of the set of adders/subtractors or between said set and the multiplier. The means for determining final dynamic values can include a succession of registers of the same size timed by respective clock signals of increasing frequency from one stage to the next and respectively connected to the means for determining global dynamic values of the corresponding stage and to the preceding register via an adder.

The invention also consists in a method of minimizing the size of internal data paths of a device for calculating a Fourier transform of predetermined initial size using a series or "pipeline" architecture in which device a succession of Fourier transform processing operations of predetermined sizes smaller than the initial size are carried out on blocks of data of successively reducing size from one processing operation to the next. According to one general feature of the invention a global dynamic value is determined for each data block from a current processing operation from dynamic values of all the data of the block and the data of the block is rejustified allowing for said global dynamic value before the next processing operation is carried out on this data.

In one particular embodiment of the invention, in which the input data of the device is timed at a predetermined basic clock rate, each processing operation is timed by said basic clock and in that the start of the next processing operation on the data of the block from the current processing operation is delayed by at least a number of basic clock cycles equal to the number of data words of the block, after acquisition of the first data of the block from the current processing operation.

The global dynamic value of each block is advantageously determined by detecting the number of sign bits of all the data words of the block, the global dynamic value being the smallest of the numbers of duplicated sign bits of said data.

The data of the block is preferably rejustified by shifting all the bits of each data word towards the most significant bit by a number of bits equal to the smallest of the numbers of duplicated sign bits.

In one embodiment of the method each global dynamic value of a block which is the subject of a processing operation is incremented by the global dynamic value of each block obtained from this block after said processing operation so as to obtain at the end of processing a final dynamic value for each output data word.

Each output data word can then be rejustified using the final dynamic value associated with it if data output on a predetermined number of bits is required. This rejustification can be dispensed with if a floating type representation is adopted. However, in this case, to obtain a correct result the output data value must be associated with its final dynamic value.

As each processing operation includes a combination of additions and subtractions followed by a multiplication, the data can be rejustified before carrying out the additions and subtractions or after carrying out the additions and subtractions but before carrying out the multiplication.

BRIEF DESCRIPTION OF THE DRAWINGS

Other advantages and features of the invention will emerge from a reading of the detailed description of one non-limiting embodiment of the invention shown in the appended drawings in which:

FIG. 7 shows a timing diagram corresponding to the calculation graph from FIG. 1 and to the operation of the device from FIGS. 2, 3 and 4.

DETAILED DESCRIPTION OF THE INVENTION

In the example now described, the initial size N of the Fourier transform is equal to 32 and the calculation is reduced to the calculation of three Fourier transforms of sizes $r_1$, $r_2$ and $r_3$ respectively equal to 4, 4 and 2. This is therefore a mixed root Fourier transform since the size $r_t$ of the tth processing stage (t=1, 2 or 3) is different for the first two stages and for the third and final stage. The invention naturally applies also to uniform root Fourier transforms. Each input data word is a complex word having a real part and an imaginary part coded on n bits using 2's complement notation and justified between −1 and 1.

Figure 1:
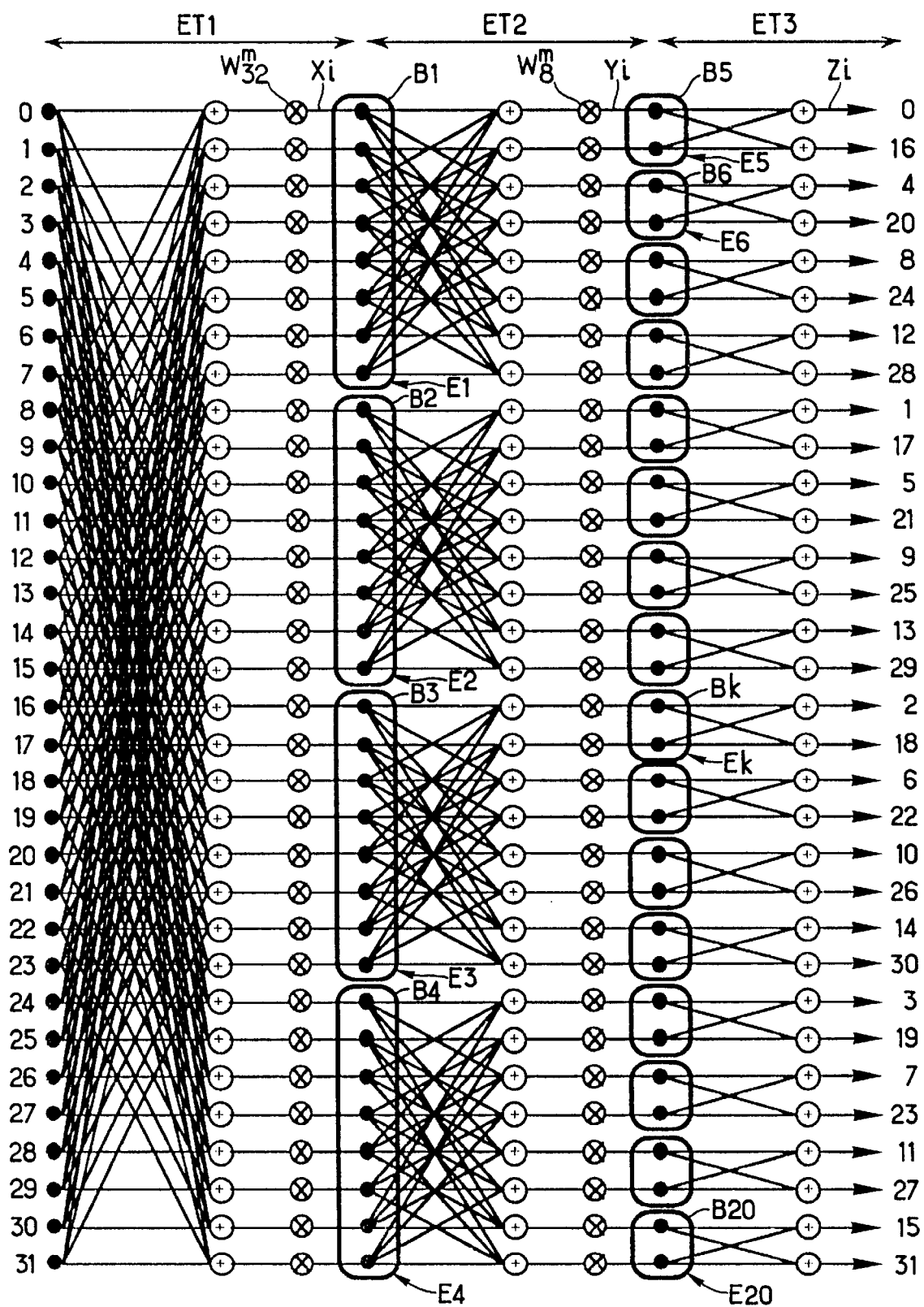
FIG. 1 shows the butterfly structure calculation graph implemented in a three-stage pipeline architecture device.
Figure 2:
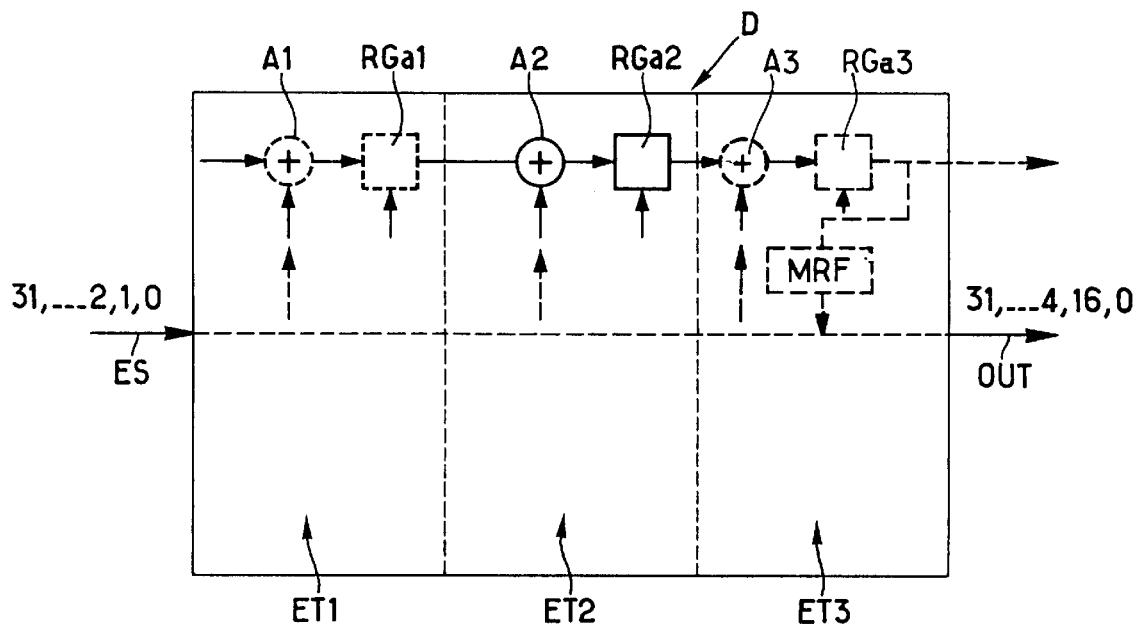
FIGS. 2 and 3 show the architecture of the device corresponding to the FIG. 1 graph in more detail.

Referring to FIGS. 1 and 2 in particular, the first processing stage ET1 carries out size 4 Fourier transform processing on a block of 32 data words (the input data). The second processing stage ET2 carries out size $r_2$=4 Fourier transform processing on four successive blocks B1, B2, B3 and B4 each of eight data words. The last stage ET3 carries out size $r_3$=2 Fourier transform processing on 16 successive blocks B5 through B20 each of two data words.

Generalizing this, in a succession of processing stages, the tth stage carries out size $r_t$ Fourier transform processing on successive blocks of $r_t N_t$ data words where $$N_t = N/\pi \, r_{t'}$$
$$t' \leq t$$

where n denotes the "product" function.

The first processing stage ET1 carries out butterfly type processing on groups of four data words. The output (intermediate) data Xi obtained after processing by the butterflies and multiplication by a coefficient $$W_N^m$$

equal to the complex number $e^{-j2mn/N}$ can be subdivided into four blocks each of eight data words. Butterfly type processing is carried out on each of these blocks on groups of four data words. After multiplication by the coefficient Wq the output data Yi can be divided into 16 blocks of two data words each of which is processed by a butterfly type operator of a size 2 Fourier transform. FIG. 1 shows this size 2 butterfly operator without the associated multiplier, because it is located at the end of the system. The structure of this operator is well known to the person skilled in the art and is shown in "Theory and Application of Digital Signal Processing" by Lawrence R. Rabiner and Bernard Gold, for example.

Similarly, the person skilled in the art will realize that the order of the data is not the same from one stage to the next. Accordingly, although the input data arrives in the order 0, 1, 2, . . . , 31, as shown in FIG. 2 in particular, in this example the output data is delivered in the order 0, 16, 4, . . . , 31.

As described in more detail later, in each stage from the second stage onwards a global dynamic value E1–E20 is determined for each data block B1–B20 from dynamic values of all the data of the block. This enables rejustification of the data of the block before processing in the butterfly operator. Of course, it may be possible (although it is not indispensable) to provide means for calculating a global dynamic value for the block of 32 input data words, since these have a common justification such that their real and imaginary parts are all between −1 and 1.

Figure 4:
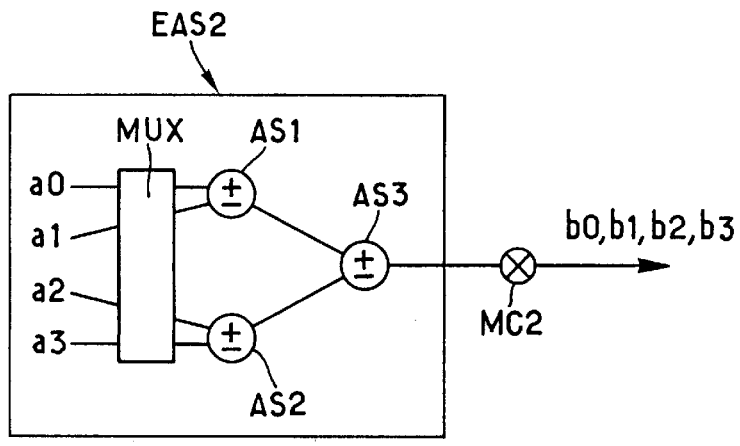
FIG. 4 is a diagram showing the hardware architecture of a butterfly type hardware operator as used in the FIG. 1 graph, FIGS. 5 and 6 respectively show two data words before and after intermediate rejustification.
Figure 3:
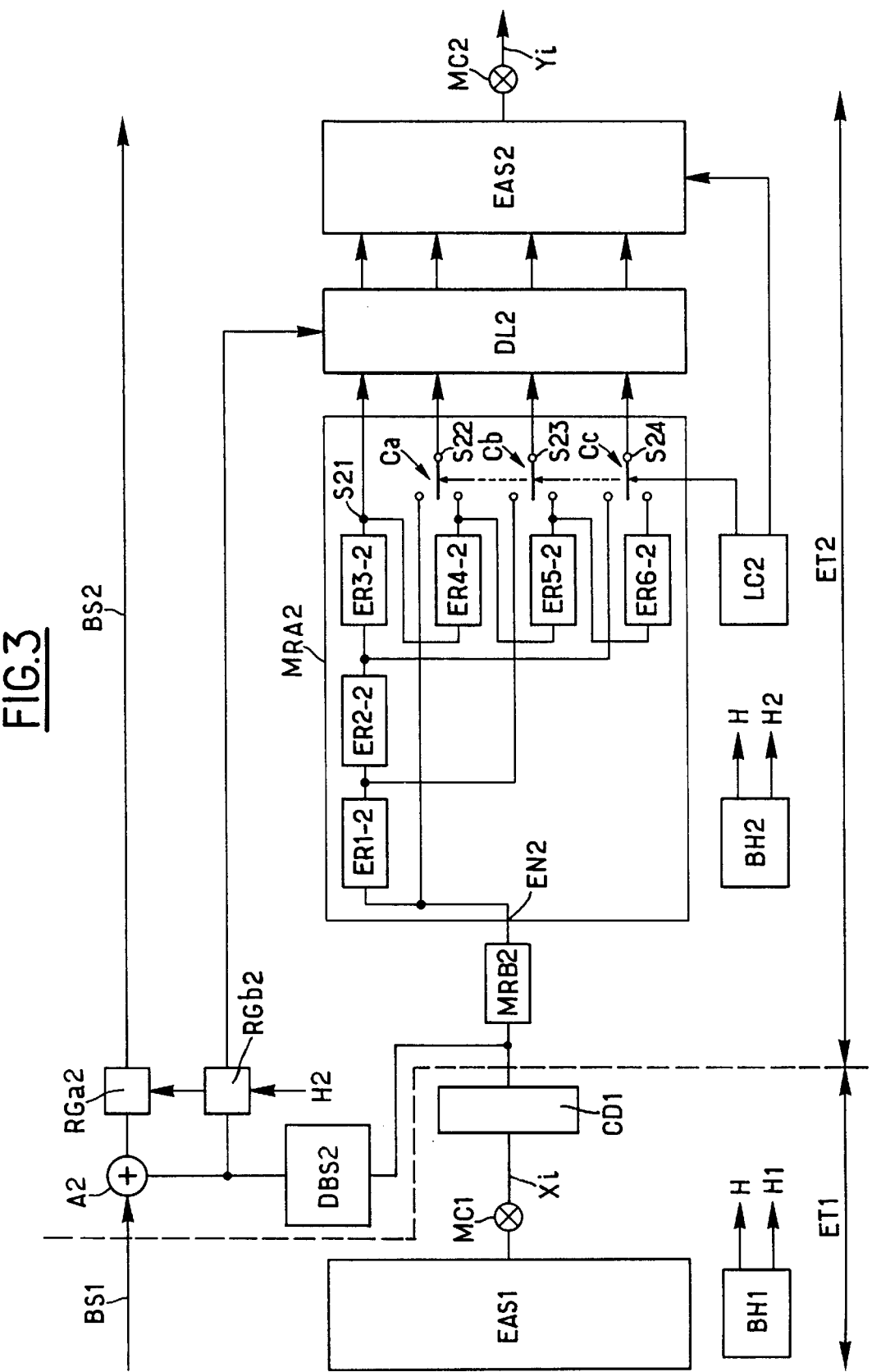

FIGS. 2 through 4 show the hardware architecture of a circuit D implementing the FIG. 1 calculation graph. This circuit is advantageously hardwired, i.e. integrated on a silicon chip, for example, and being made up of discrete elements can be divided into a succession of successive processing stages ET1, ET2, ET3 connected to each other and between the data input ES and the data output OUT by n-bit internal data paths (buses). Each processing stage, for example the 2nd processing stage ET2, includes processing means EAS2, MC2 for carrying out size $r_t$ Fourier transform processing on successive blocks of data of reduced size. The processing means EAS1, MC1 of the 1st stage ET1 thus carry out size 4 Fourier transform processing on successive groups of four input data words from the block of 32 input data words, in a predetermined order.

The processing means of the 2nd stage ET2 likewise carry out size 4 Fourier transform processing on successive groups of four data words from block B1, in a predetermined order and corresponding to the respective butterflies of the calculation graph, and then another size 4 Fourier transform calculation on successive groups of four data words from block B2, and so on up to the data of block B4.

The processing means of each stage, including the 2nd stage ET2, are timed by a basic clock signal H delivered by an appropriate circuit BH2. The processing means EAS2, MC2 of stage ET2 are associated with first selective time-delay means MRA2 adapted to deliver the successive groups of $r_t$ data words in a predetermined order to the processing means EAS2, MC2 at the clock rate of the basic clock signal H and with a predetermined time-delay for each block received.

The first selective time-delay means MRA2 of the 2nd stage ET2 include four outputs S21, S22, S23, S24 connected to the processing means EAS2, MC2. They also include two sets of three time-delay elements ER1-2 through ER6-2 connected in series. The first set of elements includes the elements ER1-2 through ER3-2. The second set of elements includes the elements ER4-2 through ER6-2.

The output of the last time-delay element ER3-2 of the first set is connected directly to the output S21. The outputs of the time-delay elements ER4-2 through ER6-2 of the second set are respectively connected to the other outputs S22, S23, S24 by means of one input of the two-input selective switching means Ca, Cb, Cc.

The inputs of the time-delay elements of the first set are respectively connected to the other inputs of the switching means Ca, Cb, Cc.

The switching means Ca, Cb, Cc are controlled by control signals from control logic LC2. One way of controlling these switches is described in the previously mentioned article by BI and JONES, the content of which is hereby incorporated by way of reference.

The "size" of each of the time-delay elements, i.e. the number of data words that they can each store temporarily, is equal to two for the 2nd stage ET2. More generally, in a succession of processing stages, the size of each of the time-delay elements is equal to $$N/\pi_{t'}$$
$$t' \leq t$$

where t is the stage number.

Of course, the person skilled in the art will realize that although the word "size" is used for simplicity in respect of the number of data words to be stored, the storage capacity of each time-delay element is in fact greater than this since each data "word" is made up of two words respectively representing its imaginary part and its real part.

Second time-delay means MRB2 include a time-delay element of the same size as the time-delay elements of the first time-delay means MRA2 and the output of which is connected to the input EN2 of the first time-delay means MRA2 (and therefore in this example to the input of the first time-delay element ER1-2 of the first set).

Figures 5, 6, 8:
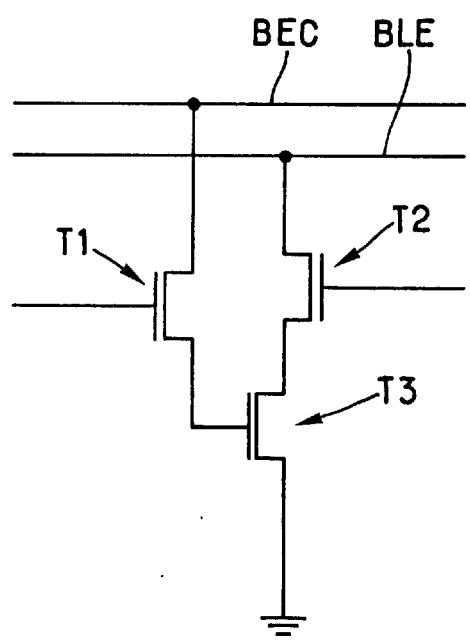
FIG. 8 is a diagram showing a hardware implementation of a memory point of a dynamic delay line usable in a device of the invention.

All these time-delay elements have sequential access memory means timed by the basic clock signal H. They may be implemented in shift registers, for example, or using first in/first out (FIFO) memories. It is particularly advantageous, for reasons concerning their overall size, to use dynamic delay lines whose various memory points comprise three transistors as shown in FIG. 8. The gates of the two transistors T1 and T2 are respectively controlled by write and read signals. They are respectively connected between a write bus BEC and a read bus BLE and are also connected to ground via a third transistor T3. The value stored is held in the transistor T3.

The processing means of each stage, such as those of the stage ET2 shown diagrammatically in FIG. 4, include a set EAS2 of complex adders/subtractors (there are three of these devices in this example: AS1, AS2, AS3), followed by a complex multiplier MC2. The processing means have $r_t$ inputs (four inputs in this example) connected to the two adders/subtractors AS1, AS2 by a multiplexer MUX controlled by the control logic LC2. A more complete implementation of this type of operator is described in the previously mentioned article by BI and JONES. On simultaneously receiving four input data words a0, a1, a2 and a3 the processing means deliver four successive data output words b0, b1, b3, b4 corresponding to the Fourier transform of the input data.

Means CD1 for justifying (left-justifying, for example) on n bits data Xi from the processing means of the stage ET1 are provided between the output of the multiplier MC1 of the processing means of the stage ET1 and the input of the stage ET2 (i.e. in this example the input of the second time-delay means MRB2).

The output of the means CD1 of the stage ET1 is connected to means DBS2 capable of determining a global dynamic value for each block of data from the multiplier MC1 from dynamic values of all the data of the block.

In concrete terms, if each data word is coded in 2's complement binary notation on a predetermined number of bits, detection of the dynamic value of each data word is based on detection of the number of sign bits duplicated in the word of that data word. The means DBS2 then include means for comparing the value of the most significant bit of the data word with a certain number of immediately adjacent bits, for example three such bits. The number of adjacent bits equal to the sign bit determines the number of sign bits duplicated. In the example shown in FIG. 5 in which S denotes the sign bit and BT1 through BT6 denote the significant bits, the three bits on the left are identical, which corresponds to two duplicated sign bits.

The means DBS2 also include means for determining the smallest number of duplicated sign bits for all the data of the block in question. This smallest number, which represents the global dynamic value of the block, is then stored in a register RGb2 controlled by a clock signal H2 derived from the basic clock signal H.

Means for rejustifying data supplied by the time-delay means MRA2 are provided between the output of these time-delay means and the input of the set EAS2 of adders/subtractors of the processing means of the stage ET2. These data rejustification means include in this example a shifter DL2 adapted to shift all the data of a block towards the left, i.e. towards the most significant bit, by an amount equal to the number stored in the register RGb2. Accordingly, as shown in FIG. 6, the shifted data word now has as the most significant bit the sign bit S followed by six significant bits BT1 through BT6. The last two bits of this word, which before shifting have the values BT5 and BT6, now have the value 0. The person skilled in the art will readily understand that this left shifting of the significant bits of the data word allowing for the previously calculated global dynamic value preserves acceptable accuracy of the data whilst retaining representation on n bits.

The output of the means DBS2 is connected to an adder A2 the other input of which is connected to a data transmission bus BS1 and the output of which is connected to another register RGa2 also controlled by the clock signal H2. The output of the register RGa2 is connected to another part BS2 of the data transmission bus. The function of these means is described in more detail below.

The operation of the device of the invention will now be described in detail with reference to the timing diagram shown in FIG. 7.

For simplicity, FIG. 7 is based on the assumption that the calculations carried out by the adders/subtractors and the complex multipliers, the detection of the number of duplicated sign bits and the addition in the various adders A1, A2, A3 (see FIG. 2 in particular) are carried out in a single clock cycle of the basic clock H.

The clock signal H2 of the stage ET2, the rising edges of which are synchronized with the starts of the data blocks from the multiplier MC1, has a frequency equal to one eighth the frequency of the basic clock signal H.

The data X0–X7 forms the first data block B1 from the processing means of the stage ET1. The number of duplicated sign bits of each of these data words is detected in the means DBS2 and the global dynamic value E1 of this block, i.e. the smallest number of duplicated sign bits, is stored in the register RGb2 on the next rising edge of the clock H2. As and when the data of the block is supplied by the multiplier MC1, it is stored in the memory means MRB2 and MRA2 and then output sequentially in a predetermined order in groups of four at the four outputs S21, S22, S23 and S24. However, given the nature of the time-delay means MRA2 and MRB2 and their memory capacity, the first group of data X0, X6, X4, X2 is present at the outputs S21, S22, S23 and S24 of the time-delay means (and thus ready to be processed by the processing means of the stage ET2) only after all the data of the block X0–X7 has been supplied by the multiplier MC1.

In other words, in a succession of Fourier transform stages, the start of the next processing (i.e. the processing in the stage ET2 in this example) of the data of a block from the current processing (stage ET1) is delayed by a number of basic clock cycles at least equal to $r_t N_t$, starting from acquisition of the first data of the block output by the multiplier MC1.

The eight successive groups G1–G8 of four data words at the output of the time-delay means MRA2 are then shifted to the left by the value E1 in shifter DL2 before they are forwarded to the set EAS2 of adders/subtractors of the processing means of the stage ET2.

The person skilled in the art will realize that the time-delay element MRB2 in indispensable. In the absence of this element some of the data from the multiplier MC1 would have been present at the input of the set EAS2 before all of the data of the block B1 had been supplied by the multiplier MC1. It would therefore have been impossible to rejustify the first group G1 of four data words supplied by the time-delay means MRA2 and MRB2 to the set EAS2.

The same operations are carried out for the second data block B2 from the multiplier MC1. The global dynamic value E2 is also stored in the register RGb2 so that the data of this block can be shifted before it is processed in the set EAS2.

Note that although in this example the shifter DL2 is on the input side of the set EAS2 of adders/subtractors, it is advantageous to shift the data between the output of this set EAS2 and the input of the multiplier MC2 because this simplifies the structure of the shifter.

There are therefore obtained at the output of the means DBS2 four global dynamic values E1, E2, E3 and E4 respectively associated with the four blocks B1, B2, B3 and B4. These four values are added in the adder A2 to the input data available on the bus BS1. In this example this input value is equal to 0 since no dynamic value has been calculated for the block of 32 input data words. Consequently, the four global dynamic values E1–E4 are stored in the register RGa2.

At the output of the multiplier MC2 the data Yi is divided into 16 blocks B5–B20 each of two data words, holding 16 global dynamic values E5–E20 used to rejustify the data, in a manner similar to that previously explained, before the data is processed in the processing means of the stage ET3. The data blocks B5 through B8 are obtained from the data block B1, the data blocks B9 through B12 from the data block B2, the data blocks B13 through B16 from the data block B2 and the data blocks B17 through B20 from the data block B4. The 16 values E5–E20 are supplied to the register RGa3 of the stage ET3 (FIG. 2). The first four values in this register are respectively equal to the global dynamic value E1 of the block B1 incremented by the four global dynamic values E5–E8 associated with the blocks B5–B8 obtained from the block B1; the other values are respectively equal to the sum of the other global dynamic values E2 through E4 incremented by the global dynamic values of the blocks obtained from the three other blocks B2–B4. The size (number of words) of the register RGa3 is the same as the size of the register RGa2. However, as it is timed by the clock signal H3 which is four times faster than the clock signal H2, it can store four times as many values.

There is therefore obtained at the output of the device D a final dynamic value for each output data word from which the total number of bits by which the data word has been shifted can be determined. In the example described each pair of output data words supplied by the processing means of the last stage is associated with the same final dynamic value.

More generally, although two detections and shifts have been described above to make it easier to understand how the device operates, in practice only one detection and one shift are carried out for the intermediate processing stages. In the case of a mixed root 32 point Fourier transform (4, 4, 2), only the second stage will include detection and shifting. With respect to the final dynamic values, if shifting and detection are applied in the final stage a final dynamic value will be associated with a block whose length is equal to the root of that stage. On the other hand, if there is no processing in this stage a final dynamic value will be associated with a block of a greater number of values (16 values if the last two stages have the root 4 and eight values for roots respectively equal to 4 and 2).

For the output data obtained to be correct, final rejustification of the data is required at the output of the device, by shifting to the right, i.e. towards the least significant bit, by a number of bits equal to the final dynamic value associated with each data word. Dedicated shift means MRF can be used for this (FIG. 2). However, these means are not indispensable if a "floating" representation is adopted, but in this case the device must have an auxiliary output supplying the various final dynamic values in association with each of the output data words, so that this information can be acted on subsequently.

The person skilled in the art will realize that the invention enables working with a constant dynamic and minimizes the size of the internal data paths of the circuits, limiting this size to n bits, without excessive loss of precision in respect of the intermediate data. This enables the implementation of integrated circuits capable of processing Fourier transforms with 8,192 complex points in 1 ms using submicron CMOS technology, suitable for applications in terrestrial digital television, without any unnecessary and undesirable increase in the surface area of the circuit.

We claim:

1. Electronic device for calculating a Fourier transform of a predetermined initial size, comprising a plurality (t) of successive processing stages where t is an integer, connected in series between an input and an output of the device by internal data paths and comprising respective processing means adapted to carry out Fourier transform processing of predetermined sizes ($r_t$) smaller than the initial size on blocks of data of successively reduced size from one said processing stage to a next, comprising:

means for determining a global dynamic value for each said data block supplied by the processing means of a previous processing stage from dynamic values of all the data of each said data block;

time-delay means for delaying supply of the data of each said data block to the processing means of a current processing stage at least until all the data of each said data block has been supplied by the processing means of the previous processing stage;

intermediate rejustification means for rejustifying the data of each said data block allowing for the corresponding global dynamic value and for supplying the rejustified data to the processing means of the current processing stage; and means for determining final dynamic values associated with each output data at the output of the electronic device, supplied by the processing means of a last processing stage and obtained from the global dynamic values successively calculated in such a way to minimize the size of the internal data paths of the device.

2. Device according to claim 1 wherein input data at the input of the device is received sequentially at an input frequency determined by a basic clock signal and the processing means of the t-th processing stage are adapted to carry out Fourier transform processing of size $r_t$ on successive data blocks at the frequency of the basic clock signal;

the time-delay means include first selective time-delay means adapted to memorize said data blocks supplied by the processing means of the previous processing stage and to supply to the processing means of the current processing stage at the frequency of the basic clock signal and with a predetermined time-delay, for each said data block received, successive groups of $r_t$ data words in a predetermined order, and second time-delay means connected to the first time-delay means and also timed by the basic clock signal; and the first and second time-delay means have a combined memory capacity at least equal to the number of data words of each said data block from the processing means of the previous processing stage.

3. Device according to claim 2 wherein the means for determining the final dynamic values include a succession of registers of the same size timed by respective clock signals of increasing frequency from one said processing stage to the next and are respectively connected to the means for determining the global dynamic values of the corresponding processing stage and to a preceding register via an adder.

4. Device according to claim 2 wherein the first selective time-delay means of the t-th processing stage have $r_t$ outputs connected to the processing means of the t-th processing stage and two sets of $r_t-1$ time-delay elements connected in series;

the output of the final time-delay element of the first set is connected directly to one output of the $r_t$ outputs of the first time-delay means;

the outputs of the time-delay elements of the second set are respectively connected to the other outputs of the first time-delay means via one input of selective switching means having two inputs;

the inputs of the time-delay elements of the first set are respectively connected to the other inputs of the two-input switching means;

the second time-delay means include a time-delay element connected to the input of the first selective time-delay means; and all the time-delay elements have the same memory size.

5. Device according to claim 4 wherein the time-delay elements include dynamic delay lines.

6. Device according to claim 5 wherein the means for determining the global dynamic value of each said data block include means for determining the number of duplicated sign bits of each data word of the data block, said global dynamic value associated with the data block being the smallest of the numbers of duplicated sign bits.

7. Device according to claim 1 wherein the means for determining the global dynamic value of each said data block include means for determining the number of duplicated sign bits of each data word of the data block, said global dynamic value associated with the data block being the smallest of the numbers of duplicated sign bits.

8. Device according to claim 1 wherein the intermediate rejustification means include means for shifting the bits of each data word of the data block towards the most significant bit, said shift means being connected to the means for determining the global dynamic value.

9. Device according to claim 8 wherein the processing means of each said processing stage include a set of adders/subtractors followed by a multiplier and wherein the shift means are on an input side of the set of adders/subtractors or between said set and the multiplier.

10. Device according to claim 1 wherein the time-delay means are between the processing means of each pair of consecutive processing stages.

11. Device according to claim 1 wherein the means for determining the global dynamic values are connected to the output of the processing means of each said processing stage.

12. Device according to claim 1 wherein the intermediate rejustification means include means for shifting the bits of each data word of the data block towards the most significant bit, said shift means being connected to the means for determining the global dynamic value.

13. Method of minimizing the size of internal data paths of a device for calculating a Fourier transform of predetermined initial size using a series or pipeline architecture in which device a succession of Fourier transform processing operations of predetermined sizes smaller than the initial size are carried out on blocks of data of successively reducing size from one said processing operation to a next, comprising the steps of:

determining a global dynamic value for each said data block from a previous processing operation from dynamic values of all the data of the data block;

rejustifying the data of each said data block allowing for said global dynamic value before a current processing operation is carried out on the data; and supplying the rejustified data to the current processing operation.

14. Method according to claim 13 wherein input data at the input of the device is supplied at a timing rate of a predetermined basic clock (4) and each said processing operation is timed by said basic clock, further comprising the step of:

delaying the start of the current processing operation on the data of each said data block from the previous processing operation by at least a number of basic clock cycles equal to the number of data words of the data block, after acquisition of the first data of the data block from the previous processing operation.

15. Method according to claim 13, wherein the step of determining the global dynamic value of each said data block comprises the step of detecting the number of sign bits of all the data words of the data block, the global dynamic value being the smallest of the numbers of duplicated sign bits of said data.

16. Method according to claim 15, wherein the step of rejustifying the data of the data block comprises the step of shifting all the bits of each said data word towards the most significant bit by a number of bits equal to the smallest of the numbers of duplicated sign bits.

17. Method according to claim 16, further comprising the step of:

incrementing the global dynamic value of each said data block which is the subject of the processing operation by the global dynamic value of each said data block obtained from the data block after said processing operation to obtain, at the end of processing, a final dynamic value for each data word obtained at an output of the device.

18. Method of minimizing the size of internal data paths of a device for calculating a Fourier transform of predetermined initial size using a series or pipeline architecture in which device a succession of Fourier transform processing operations of predetermined sizes smaller than the initial size are carried out on blocks of data of successively reducing size from one said processing operation to a next, wherein input data at an input of the device is supplied at a timing rate of a predetermined basic clock (4), and each said processing operation is timed by said basic clock, comprising the steps of:

determining a global dynamic value for each said data block from a previous processing operation from dynamic values of all the data of the data block;

delaying the start of a current processing operation on the data of each said data block from the previous processing operation by at least a number of basic clock cycles equal to the number of data words of the data block, after acquisition of the first data of the data block from the previous processing operation;

rejustifying the data of each said data block allowing for said global dynamic value before the current processing operation is carried out on the data;

supplying the rejustified data to the current processing operation; and incrementing each said global dynamic value of the data block which is the subject of the processing operation by the global dynamic value of the data block obtained from the data block after said processing operation to obtain, at the end of processing, a final dynamic value for each output data word at an output of the device.

19. Method according to claim 18, wherein the step of determining the global dynamic value of each said data block comprises a step of detecting the number of sign bits of all the data words of the data block, the global dynamic value being the smallest of the numbers of duplicated sign bits of said data.

20. Method according to claim 19, wherein the step of rejustifying the data of each said data block comprises a step of shifting all the bits of each data word towards the most significant bit by a number of bits equal to the smallest of the numbers of duplicated sign bits.

* * * * *